(12) United States Patent
Pickering et al.

(10) Patent No.: US 7,571,662 B2
(45) Date of Patent: Aug. 11, 2009

(54) SELECTOR MECHANISM FOR A MOTOR VEHICLE TRANSMISSION

(75) Inventors: Carl Pickering, Kenilworth (GB);
Alister Whelan, Leamington Spa (GB);
Mike Richardson, Redditch (GB); Rob Jerger, Warwickshire (GB); Peter Hudson, Warwick (GB)

(73) Assignee: Jaguars Cars Limited (GB)

( * ) Notice: Subject to any disclaimer, the term of this patent is extended or adjusted under 35 U.S.C. 154(b) by 351 days.

(21) Appl. No.: 11/205,486

(22) Filed: Aug. 17, 2005

(65) Prior Publication Data

US 2006/0037424 A1    Feb. 23, 2006

(30) Foreign Application Priority Data

Aug. 18, 2004  (GB) ................................. 0418358.8
Nov. 13, 2004  (GB) ................................. 0425115.3

(51) Int. Cl.
*F16H 59/04* (2006.01)

(52) U.S. Cl. ..................... 74/473.3; 74/335; 200/61.88; 200/61.91; 701/62

(58) Field of Classification Search .............. 74/473.12, 74/473.21, 473.3, 335; 192/220.2, 220.3, 192/220.4; 200/61.88, 61.91, 11 R, 11 TC, 200/11 TW, 336, 564; 701/51
See application file for complete search history.

(56) References Cited

U.S. PATENT DOCUMENTS 2,848,902 A * 8/1958 Hale ............................ 74/502
3,326,315 A * 6/1967 Richards ..................... 180/336
4,378,474 A * 3/1983 Olson .......................... 200/12
4,583,171 A * 4/1986 Hara et al. ..................... 701/62

(Continued)

FOREIGN PATENT DOCUMENTS

DE     102007015262 A1 * 10/2008

(Continued)

*Primary Examiner*—Thomas R Hannon
*Assistant Examiner*—Phillip Johnson
(74) *Attorney, Agent, or Firm*—Brooks Kushman P.C.

(57) ABSTRACT

A rotatable selector mechanism for a motor vehicle transmission has a selector knob rotatable in a housing to select an operating mode of the transmission among a number of selector positions indicated by a label (P,R,N,D,M). The selector mechanism further includes a detent plate which cooperates with a detent pin for maintaining the selector knob in each of positions. The detent plate is connected to position sensors for generating selector signals to a transmission control unit which supplies control signals to an actuator for operate the transmission according to the operating mode selected. The detent plate is also associated to the selector knob and to a drive correction means by means of clutch devices respectively to engage the detent plate to one of the selector knob and the drive correction means. The clutch devices and the drive corrections means are controlled by the transmission control unit to move the detent plate from a selector position selected by the driver to another selector position representative of the operating mode of the transmission by means of the drive correction means without moving the selector knob. The selector knob further includes an illuminated pointer constituted by one of several LEDs controlled by the transmission control unit so as to change the LED illuminated in front of the label according to the position of the detent plate when the latter has been moved by the drive correction means in order to indicate the operating mode of the transmission.

15 Claims, 7 Drawing Sheets

U.S. PATENT DOCUMENTS

| | | | |
|---|---|---|---|
| 5,094,115 A | 3/1992 | Michihira | |
| 5,156,243 A * | 10/1992 | Aoki et al. | 192/218 |
| 5,161,422 A * | 11/1992 | Suman et al. | 74/335 |
| 5,525,768 A * | 6/1996 | Cobb et al. | 200/61.88 |
| 5,884,528 A * | 3/1999 | Ludanek et al. | 74/473.3 |
| 6,114,638 A * | 9/2000 | Naganuma et al. | 200/6 R |
| 6,366,442 B1 * | 4/2002 | Onodera | 361/179 |
| 6,500,092 B2 * | 12/2002 | Syamoto | 477/99 |
| 6,547,696 B2 * | 4/2003 | Syamoto et al. | 477/99 |
| 6,848,332 B2 * | 2/2005 | Hayashi et al. | 74/473.33 |
| 7,029,420 B2 * | 4/2006 | Sekino et al. | 477/99 |
| 7,139,652 B2 * | 11/2006 | Kikuchi | 701/51 |
| 2002/0014396 A1 * | 2/2002 | Syamoto | 200/61.91 |
| 2002/0016233 A1 * | 2/2002 | Syamoto | 477/102 |
| 2004/0045391 A1 | 3/2004 | Sauvonnet | |
| 2004/0162661 A1 * | 8/2004 | Kikuchi | 701/62 |
| 2005/0145054 A1 * | 7/2005 | Zann et al. | 74/473.12 |
| 2006/0169085 A1 * | 8/2006 | Peuster | 74/473.12 |
| 2007/0261509 A1 * | 11/2007 | Meyer et al. | 74/504 |

FOREIGN PATENT DOCUMENTS

| | | |
|---|---|---|
| JP | 6-42613 | 2/1994 |
| JP | 2002248949 A * | 9/2002 |
| WO | WO 9617365 A1 * | 6/1996 |

\* cited by examiner

SELECTOR MECHANISM FOR A MOTOR VEHICLE TRANSMISSION

FIELD OF THE INVENTION

The present invention relates to a selector mechanism for a motor vehicle transmission, more specifically an automatic or semi-automatic vehicle transmission actuated by shift-by-wire.

TECHNICAL BACKGROUND

A selector mechanism generally comprise a selector connected to position sensors so as to select a selector mode, for instance Park (P), Reverse (R), Neutral (N) or Drive (D). The position sensors are connected to a transmission control unit supplying control signals to an actuator such as a solenoid and a motor in order to drive a transmission in accordance with output signals from the position sensors. Such vehicle transmissions when operated by shift-by-wire commonly include a wide variety of sensors, switches, and other controls. In the event that any of these components fails, the transmission may fail to function. If such a failure is detected, the transmission control unit switches to a failure or 'limp home' mode which is designed to ensure that, as far as possible, the vehicle will be drivable and safe. Generally in this mode the transmission control will attempt to maintain the current gear and the failure is indicated to the driver by means of a warning light or text message.

Despite the various warning alerting the driver that the transmission is in limp-home mode, it is still possible for the selector to be moved to a position to select an inappropriate selector mode, possibly causing immediate and unexpected motion of the vehicle.

According to the particular type of selector mechanism, several alternatives have been proposed to overcome this problem. One alternative is disclosed on the Aston Martin™ DB9™ where the selector takes the form of individual switches on the dashboard, each for selecting an operating mode for the transmission. In this alternative, the transmission control unit stops the engine if the driver selects an operating mode which is not available. In the other forms of selector, i.e. a lever or a rotary knob, the driver must move the selector through a Neutral position to get a Drive position or a Reverse position. In such cases, if the transmission is in limp-home mode and the driver moves the selector towards a mode which is unavailable the transmission control unit will shift the transmission to Neutral. Both of these known types of alternative have certain inherent disadvantages for driver convenience and safety.

The present invention has as an object the provision of an improved selector mechanism for a vehicle transmission having an improved interaction with the driver when the transmission is in a limp-home mode.

SUMMARY OF THE INVENTION

According to a first aspect of the invention there is provided a selector mechanism for a motor vehicle transmission having a number of operating modes, the selector mechanism having a housing, a rotary handle movable in the housing between a number of selector positions, each position being associated with a respective one of the operating modes of the transmission, a rotary selector which in normal use of the selector mechanism is connected to the rotary handle so as to rotate with the rotary handle, sensor means for sensing the position of the rotary selector and generating selector signals to a transmission control unit which in use supplies control signals to the transmission, an indexing means for maintaining the rotary handle in each of its positions, a drive correction means and clutch devices to engage the rotary selector to one of the rotary handle and the drive correction means, wherein the clutch devices and the drive correction means in use are controlled by the transmission control unit to move the rotary selector from a selector position selected by the driver by means of the rotary handle to another selector position representative of the operating mode of the transmission by means of the drive correction means without moving the rotary handle.

Preferably, the selector mechanism further comprises a dynamic indicator which in use is arranged to indicate the operating mode of the transmission. The dynamic indicator in use is connected to the transmission control unit to be visible when the vehicle is to be driven and move with the rotary selector.

Conveniently, the dynamic indicator comprises an illuminated pointer and an arrangement of illuminated labels indicating the selector mode. The illuminated pointer may be constituted by a one of several light sources circumferentially distributed behind the top surface of the rotary handle.

The selector mechanism may further comprise a retractor actuator which in use is controlled by the transmission control unit to displace the rotary handle between an active position where it can be manually moved between the selector positions by the driver of the vehicle, and an inactive position in which it is retracted inside the housing where it cannot be readily moved by the driver.

Preferably, the selector mechanism comprises a spring-loaded detent member carried by the housing and the rotary selector comprises a detent plate having notches for cooperation with the spring-loaded detent member. The detent plate may have a slot which cooperates with a stop carried by the housing to limit the rotation of the detent plate between the two extreme selectable modes of the transmission.

Also preferably, the selector mechanism comprises a locking device which in use is controlled by the transmission control unit to prevent rotation of the rotary handle when disconnected from the rotary selector.

Preferably one of the selector positions is a manual mode position in which the selector mechanism is operable for use with an auxiliary selector in order to control the gear ratios of the transmission in a pulse manner.

The invention also provides, according to a second aspect thereof, a selector mechanism for a vehicle transmission driven by an engine, the said selector mechanism having a housing, a selector movable in the housing between a number of selector positions each associated with a respective operating mode of the transmission, sensors for sensing the position of the selector and generating selector signals to a transmission control unit which in use supplies control signals to the transmission, and a retractor actuator which in use is controlled by the transmission control unit to displace the selector between an active position where it can be manually moved between the selector position by the driver of the vehicle, and an inactive position in which it is retracted inside the housing where it cannot be readily moved by the driver.

Conveniently, the selector is a rotary switch.

Preferably, the selector mechanism further comprising a drive corrections means which in use is connected to the transmission control unit to move the selector from a selector position selected by the driver to another selector position representative of the operating mode of the transmission.

Preferably, the drive means is operable to prevent manual movement of the selector according to the state of the vehicle, i.e. in Park position.

The invention also provides, according to third aspect thereof, a transmission control system for a motor vehicle transmission having a transmission control unit which in use is connected to a communication port at which data relating to the vehicle's operation are available and including a selector mechanism which is in accordance with said first or second aspect.

The invention also provides, according to a fourth aspect thereof, a method of controlling a rotatable selector mechanism according to said first aspect when installed in a motor vehicle and the transmission control unit is in receipt of a data relating to the operational state of the vehicle in which the transmission control unit determines, after receiving a signal of the sensors, whether the selector mode is available and if the selector mode is unavailable the transmission control unit operates the clutch devices to engage the rotary selector to the drive correction means and disengage the rotary selector from the rotary handle, then send a command to the drive correction means to return the rotary selector to the previous gear position.

Also preferably, when the selector mechanism includes a dynamic indicator, the method includes sending a command from the transmission control unit to the dynamic indicator to indicate the mode of the transmission according to the motion of the rotary selector.

Preferably, when the selector mechanism includes an illuminated pointer having several light sources and an arrangement of illuminated labels, the transmission control unit sends a command to turn the illuminated pointer off and a command to illuminate the label of the current selector mode.

Also preferably, when the selector mechanism includes a retractor actuator, the method includes sending a command from the transmission control unit to the retractor actuator to move the rotary switch to the active position when the engine is running and to move the rotary switch to the inactive position when the engine is stopped.

Conveniently, if the transmission control unit detects or receives a failure signal, the transmission control unit sends a command to the retractor actuator to move the selector towards the inactive position from the active position.

Preferably, when the selector mechanism includes a locking device, if the transmission control unit detects or receives a failure signal, the transmission control unit sends a command to the locking device to prevent rotational movement of the rotary handle.

Conveniently when the selector mechanism includes an auxiliary selector and if the transmission control unit detects or receives a signal from the auxiliary selector, the transmission control unit sends a command to the drive correction means and the dynamic indicator so as to rotate the rotary selector and change the indication of the dynamic indicator from indicating a Drive mode to indicating a Manual mode. Similarly, if the selector mechanism is in a manual mode and the transmission control does not detect or receive a signal from the auxiliary selector for a predetermined time period, the transmission control unit may send a command to the drive correction means and the dynamic indicator so as to rotate the rotary selector and change the indication of the dynamic indicator from the Manual mode to the Drive mode.

The invention also provides, according to a fifth aspect thereof, a method of controlling a selector mechanism according to said second aspect when installed in a motor vehicle, and the transmission control unit is in receipt of a data relating to the operational state of the vehicle, in which, if the transmission control unit detects or receives a failure signal, the transmission control unit sends a command to the retractor actuator to move the selector towards the inactive position from the active position.

Preferably, the method includes sending a command from the transmission control unit to the retractor actuator to move the selector to the active position when the engine is running and to move the selector to the inactive position when the engine is stopped.

Also preferably, when the selector mechanism includes a drive correction means, the transmission control unit determines after receiving a signal of the sensors, whether the selector mode is available and if the selector mode is unavailable the transmission control sends a command to the drive means to return the selector to the previous gear position.

BRIEF DESCRIPTION OF THE DRAWINGS

The invention will now be described by way of example with reference to the accompanying drawings, of which.

DETAILED DESCRIPTION

With reference to the drawings, there is shown a rotatable selector mechanism 10 for actuating an automatic vehicle transmission 11 driven by an engine 12. The rotatable selector mechanism 10 is located in an upper surface of a console mounted between a driver's seat and a passenger seat.

Figure 1:
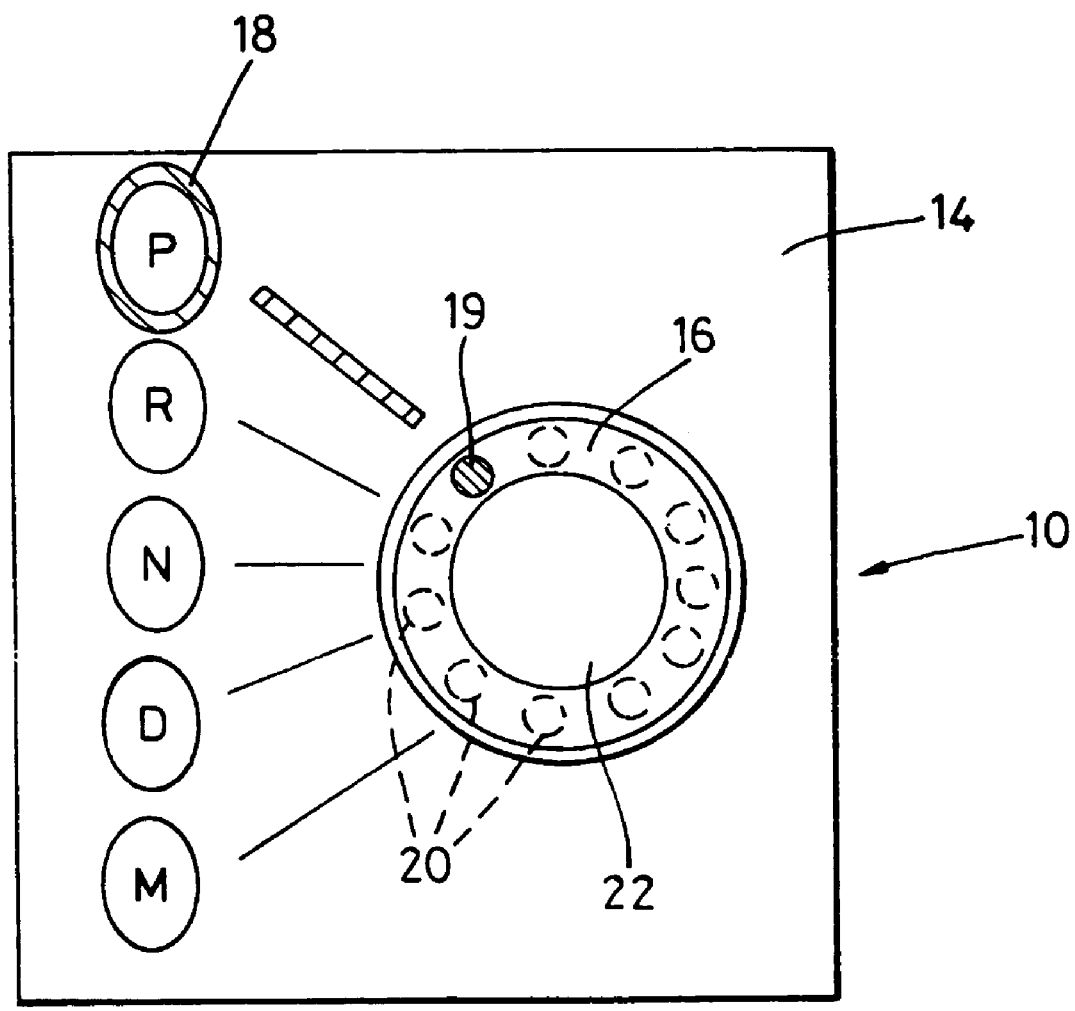
FIG. 1 is a plan view showing a selector mechanism for a vehicle transmission according to the present invention.
Figure 2:
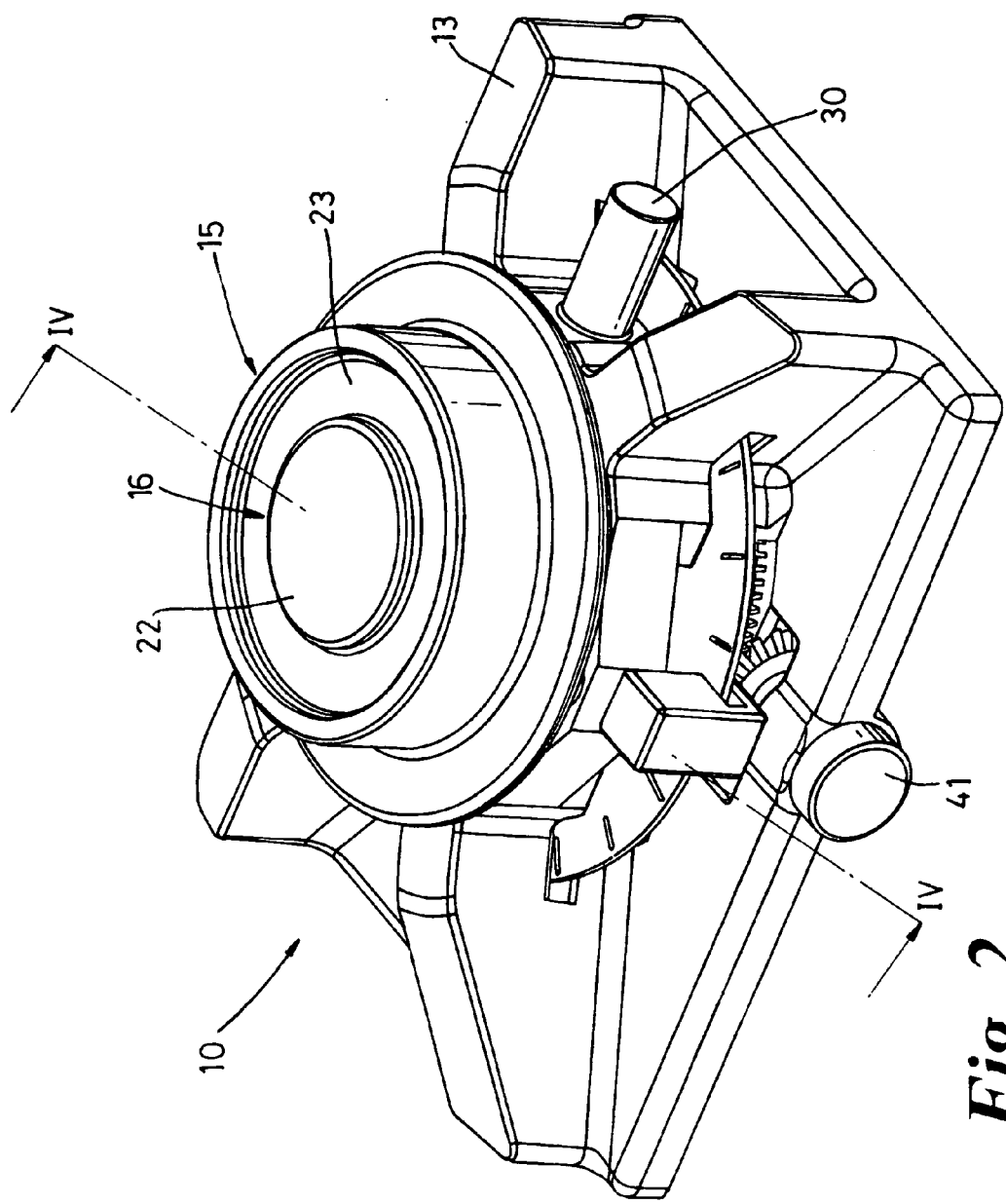
FIG. 2 is a perspective view of the selector mechanism shown in FIG. 1.
Figure 3:
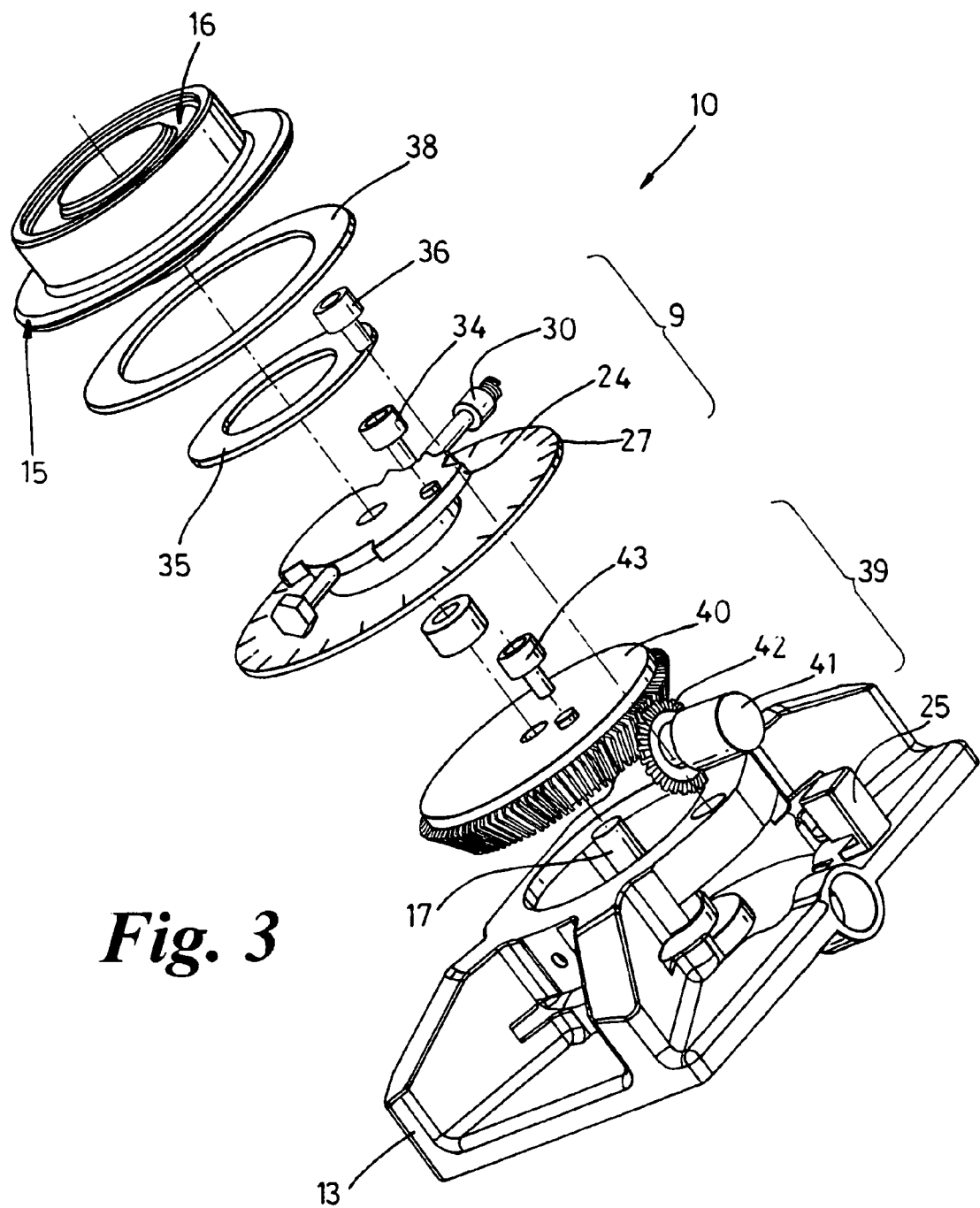
FIG. 3 is an exploded view of the selector mechanism shown in FIG. 1.

The selector mechanism 10 includes a housing formed by a base 13 and a part 14 of the console inside which a rotary handle in the form of a selector knob 15 is rotatable around a substantially vertical fixed shaft 17 mounted to the base 13. The selector knob 15 can be grasped by the driver and rotated around the shaft 17 to select the operating mode of the transmission by pointing an illuminated pointer 16 towards one of a number of labels constituted by the letters PRND. These letters correspond to the Park (P), Reverse (R), Neutral (N) and Drive (D) modes respectively in the automatic transmission (FIG. 1) and are arranged in a straight line near the selector knob 15.

Each label P, R, N and D can be illuminated, e.g. by a LED (light emitting diode) 18 located underneath the upper surface of the console 14, each LED 18 being switched on or off according to the position of the illuminated pointer 16 as it will be described in further detail.

The illuminated pointer 16 is constituted by one 19 of several light sources 20, for example LEDs, circumferentially distributed behind the top surface 21 of the selector knob 15, which is illuminated when the vehicle is to be driven, e.g. when the driver turns the engine ignition on. The arrangement of labels PRND and illuminated pointer 16 is conveniently referred to as a dynamic indicator for reasons which will be explained. In a preferred arrangement, the surface of the selector knob 15 includes a metallic centre piece 22 and a frosted transparent plastics ring 23 so that the LEDs 20 cannot be seen if not illuminated.

As illustrated in greater detail in FIGS. 2 to 8, the selector mechanism further includes, between the selector knob 15 and the base 13, a cam plate or detent plate 24 which is rotatable around the shaft 17. The detent plate 24 forms part of a rotary selector 9 which is normally connected to the selector knob 15.

Figure 8:
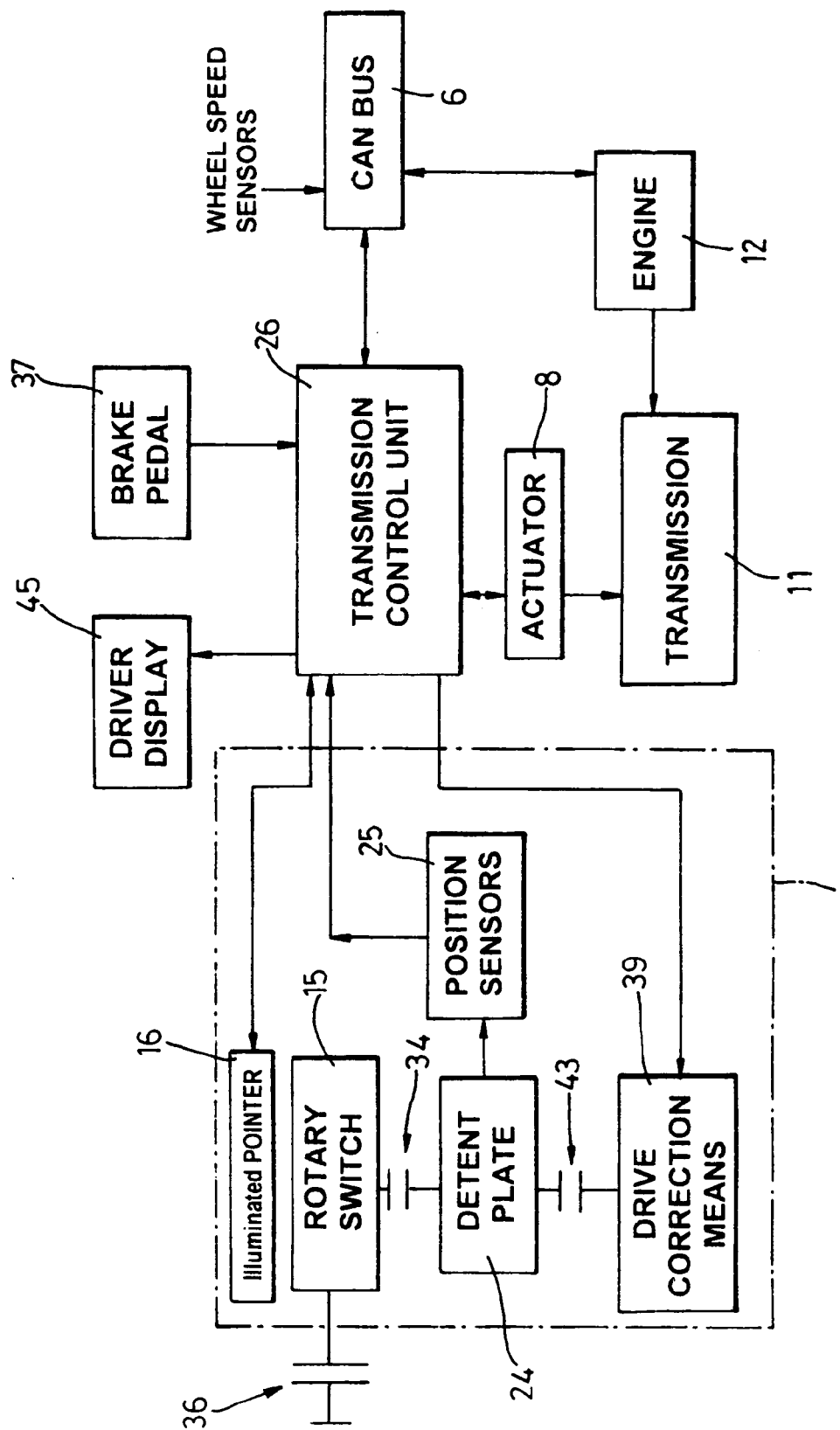
FIG. 8 is a block diagram showing a transmission control system of a motor vehicle equipped with a selector mechanism according to the present invention.

The detent plate 24 is connected to a sensor means in order to detect a position of the selector knob 15 and to transmit an input to a transmission control unit 26 (FIG. 8). This sensor means includes a sensor or encoder 25 that reads scan marks on a disc 27 fixed to the detent plate 24 to provide a sensor output signal which is representative of the direction and magnitude of the motion of the detent plate 24.

Figure 6:
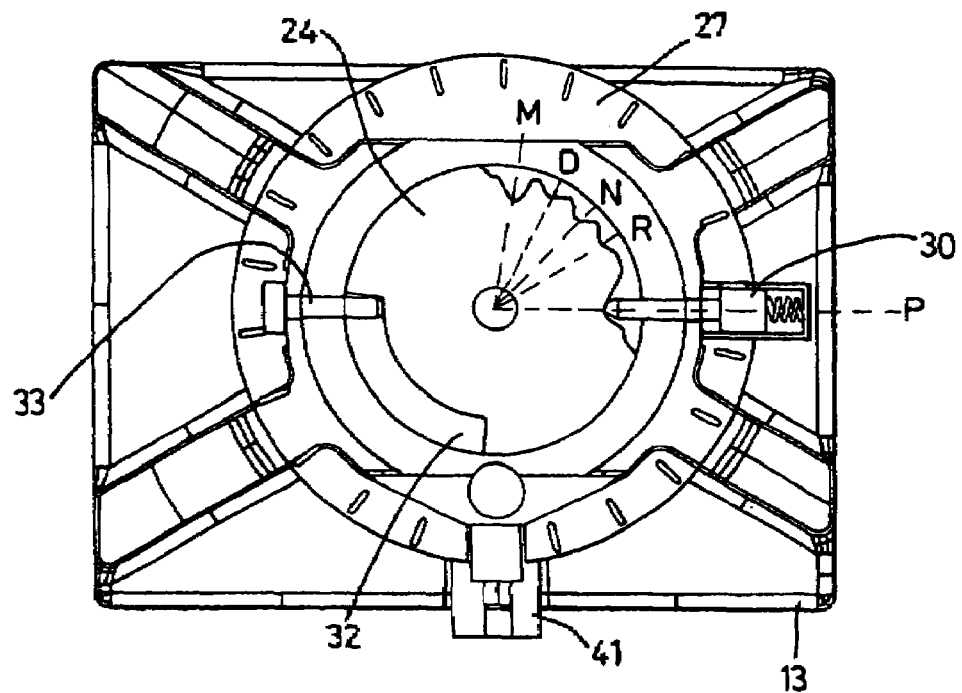
FIG. 6 is a plan view of the selector mechanism shown in FIG. 3 but with some parts omitted to show certain components in a Park position.
Figure 7:
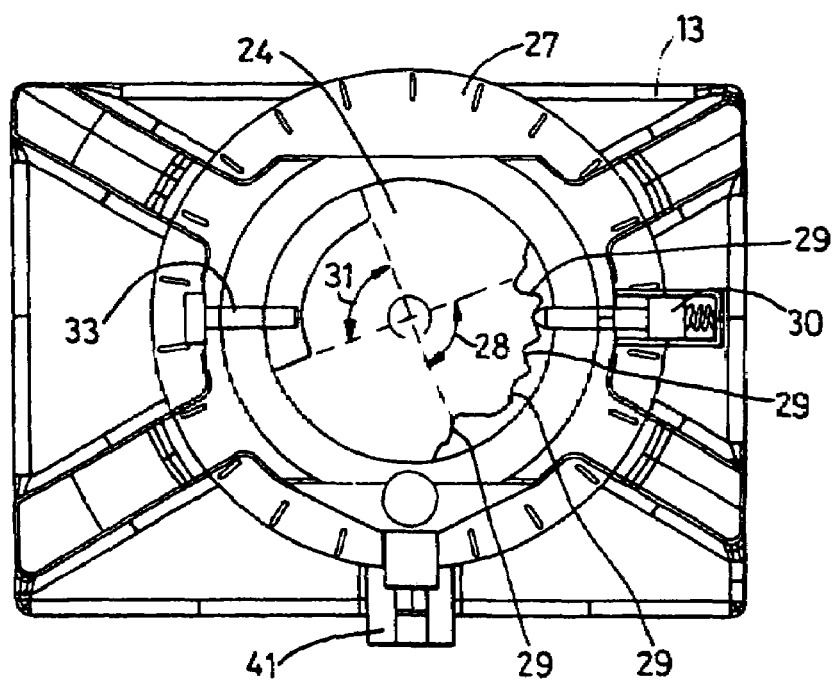
FIG. 7 is view similar to FIG. 6 showing the components in a Drive position.

The detent plate 24 is provided on its periphery with notches 29 over a sector 28 and these can be engaged successively by a cam detent pin 30 when the detent plate 24 rotates, as illustrated in FIG. 6 and FIG. 7. These notches 29 are arranged in such a way that each selection mode P, R, N, D and optional a manual mode (M) corresponds to an angular position of the detent plate 24. Thus the cooperation between the detent pin 30 and the notches 29 forms an indexing means ensuring the immobilization of the selector knob 15 in its different positions, respectively P, R, N and D. Furthermore, the depth and the shape of each notch are different for each position of the selector knob 15 so that not only is the driver able to feel the transition from one position to another but can also infer the mode selected by the feel of the detent.

The detent plate 24 is provided on its periphery with a slot 32 which extends over a sector 31 and this cooperates with a pin 33 which acts as a fixed end stop for the detent plate 24 when the pin 33 abuts either end of the slot 32.

In normal operation of the selector mechanism (FIG. 4), the selector knob 15 and the detent plate 24 are connected to one another by means of a first clutch device. The first clutch device comprises an electromagnet clamp 34 vertically fixed on the detent plate 24 in front of a first steel ring 35 fixed to the selector knob 15. The electro-magnet clamp is controlled by the transmission control unit 26 in order to engage or disengage the detent plate 24 with the selector knob 15 as it will be described further.

The selector knob 15 includes a locking device controlled by the transmission control unit 26 for preventing selector knob movement under certain fault conditions or when the selector knob 15 is in Park position and a brake pedal 37 has not been depressed. The locking device is, in the example shown, a second electromagnet clamp 36 arranged in the same way as the first electromagnet clamp 34, the second electro-magnet clamp 36 being vertically fixed on the base 13 in front of a second steel ring 38 fixed to the selector knob 15.

Figure 5:
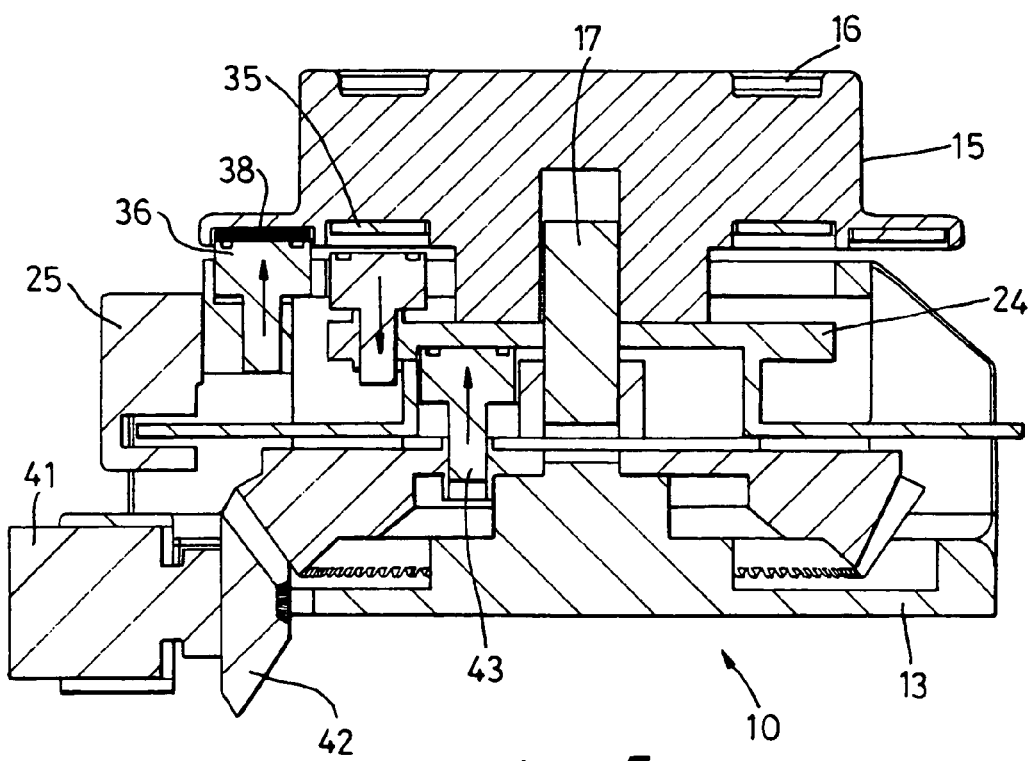
FIG. 5 is a view similar to FIG. 4 but with the selector mechanism in a correction operation.

The selector mechanism further includes a powered selector correction mode device or drive correction means 39 for rotating the detent plate 24 in cases where an inappropriate selector mode position (PRND) has been selected by the driver as it will be described in great detail below (FIG. 5). The drive correction means 39 comprises a bevel gear wheel 40 rotatable by means of an electric motor 41 and a bevel pinion 42 under the control of the transmission control unit 26. The wheel 40 includes a second clutch device arranged in the same way as the first clutch device, i.e. comprising a third electro-magnet clamp 43 fixed on the wheel 40 in front of a third steel ring 44 fixed to the detent plate 24.

The transmission control unit 26 includes a known processing logic circuit which is utilized for effecting automatic gearshifts within the transmission in a known manner.

As show in FIG. 8, the transmission control unit 26 is connected to a CAN bus 7 which allows it to communicate with other control units located in the vehicle, e.g. an engine control unit. In particular, each system makes available on the CAN bus data from the sensors associated with it, data relating to its own operation and data relating to the vehicle's operation which it has derived from the information available to it. Therefore the transmission control unit 26 receives over the CAN bus the signals from wheel speed sensors and the brake pedal 37 but also from a sensor connected to an emergency park release cable (not shown) as is usually provided on vehicle transmissions operated by shift-by-wire so as to shift the automatic transmission into Neutral to allow the car to be towed away.

Conventionally the transmission control unit 26 is also connected to a driver display 45 in order to indicate the currently engaged gear of the transmission and possibly any transmission fault.

Operation of the transmission control unit and the selector mechanism is as follows.

Starting the engine causes one LED 19 of the illuminated pointer 16 on the top of the selector knob 15 and the corresponding illuminated label 18, i.e. normally P position, to turn on while stopping the engines causes of the illuminated pointer 16 and the illuminated label 18 to turn off, hence avoiding any indication of the gear mode selected.

Figure 4:
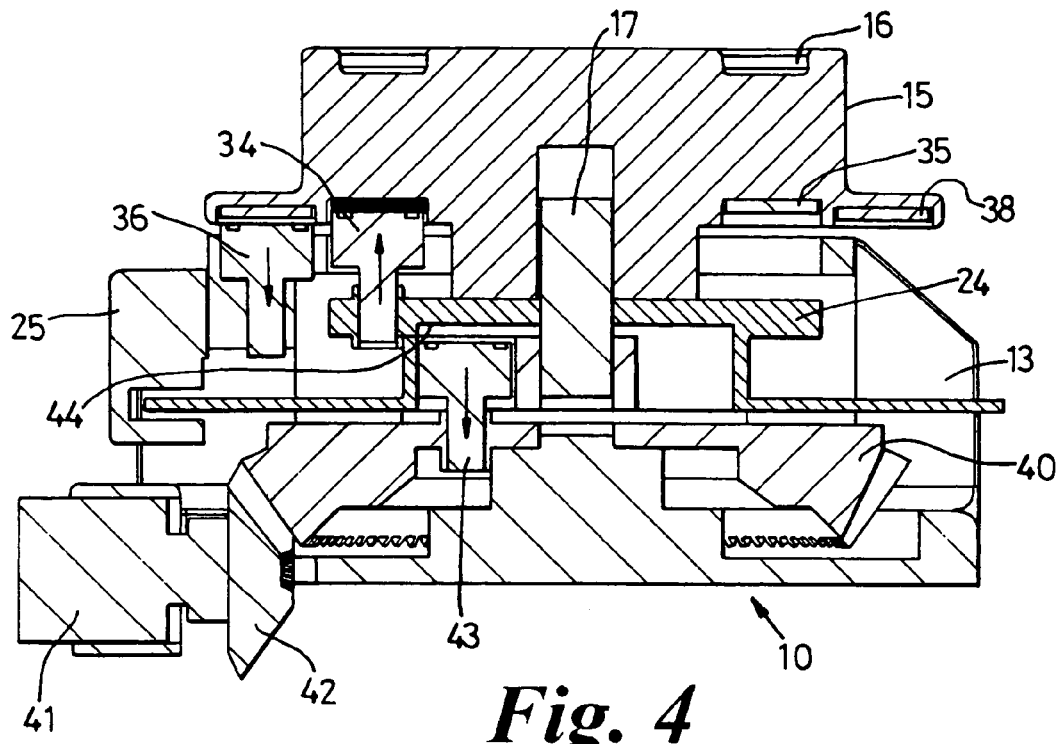
FIG. 4 is a cross-section on the line IV-IV of FIG. 2, the selector mechanism being shown in normal operation.

Thus, from a Park position of the selector knob, when the driver depresses the brake pedal 37, a brake detection signal is sent over the CAN bus and is received by the transmission control unit 26 which then unlocks the selector knob 15 by de-energising the second electromagnet clamp 36 and energises the first electromagnet clamp 34 to connect the detent plate 24 with the selector knob 15. The driver can then select an appropriate transmission mode (FIG. 4). When the new position of the detent plate 24 is detected by the encoder 25, the transmission control unit 26 checks the availability of the request and shifts the transmission by sending a command to an actuator 8 and turning on the illumination of the corresponding label.

If the transmission control unit 26 rejects the request (for example, if Reverse is selected when the vehicle is moving forward) then it sends a signal to the first electro-magnet clamp 34 to disengaged the detent plate 24 from the selector knob 15 by de-energising the first electromagnet clamp 34 and at the same time sends a signal to the second and the third electromagnet clamp 36, 43 in order to connect the bevel wheel 40 of the drive correction means 39 to the detent plate 24 and lock the selector knob 15 with the base 13 (FIG. 5). The transmission control unit 26 then sends a command to the electric motor 41 to drive the bevel pinion 42 and return the detent plate 24 to the previous mode. The transmission control unit 26 turns off both the actual illuminated LED 19 of the dynamic pointer 16 and the illuminate label 18 selected by the driver and turns on both the illuminated label 18 of the previous mode and the appropriate LED 40. The second and the third electro-magnet clamps 36, 43 can then be disengaged while the first electromagnet clamp 34 is engaged so that the rotatable selector mechanism can again be operated by the driver.

When the selector knob 15 comprises a manual mode position M the gear ratios can be controlled in a pulse manner to select the next highest (+) or lowest (−) forward gear ratio by an auxiliary selector, e.g. by a pair of paddles located near the steering wheel. The transmission control unit 26 may then send a command to the motor 41 and the third electromagnet clamp 43 to rotate the detent plate 24 without moving the selector knob 15 from a Drive mode position to a Manual mode position but only changing the LED illumination 20 of the illuminated pointer 16 and the corresponding label 18 when the driver starts to use the auxiliary selector. Similarly, the transmission control unit 26 may send a command to motor 41 and the third electromagnet clamp 43 to rotate the detent plate 24 without moving the selector knob 15 from the Manual mode position to the Drive mode position but only changing the LED illumination 20 of the illuminated pointer 16 and the corresponding label 18 when the auxiliary selector is not used for a predetermined time period.

Under a fault condition of the transmission, the transmission control unit 26 will send a command to lock the selector knob 15 in its current position and send a message to the display to alert the driver that the transmission is in failure mode. In a preferred arrangement, all the electro-magnet clamps 34, 36 and 43 will be engaged.

This method of controlling the selector knob 15 with a dynamic indicator and a drive correction means 39 enables several advantages. Firstly, it makes it possible to comply with legal requirements in case of power failure or when the park release is operated with the engine off when no indication of the current transmission mode will be indicated by the dynamic indicator. Secondly, in the situation where the driver moves the selector knob to an unavailable mode, the dynamic indicator and the rotary selector 9 will be moved to indicate the actual transmission mode. In addition, the selector knob 15 will not move but only the detent plate 24 and the dynamic indicator, thus avoiding any attempts by the driver to stop or hold the selector knob 15 in order to prevent the correction by the transmission control unit 26. Furthermore, the arrangement of a detent plate 24 which co-operates with the detent pin 30 enables the provision of a shift-by-wire selector which has multi-stable positions giving, from the driver's viewpoint, a selector mechanism close to the conventional automatic transmission selector lever having for each position mode of the selector a mechanical detent with a configurable force profile.

Although the invention has been described by way of example with reference to a specific embodiment of the invention various modifications or additions may be made without departing from the invention.

Figure 9:
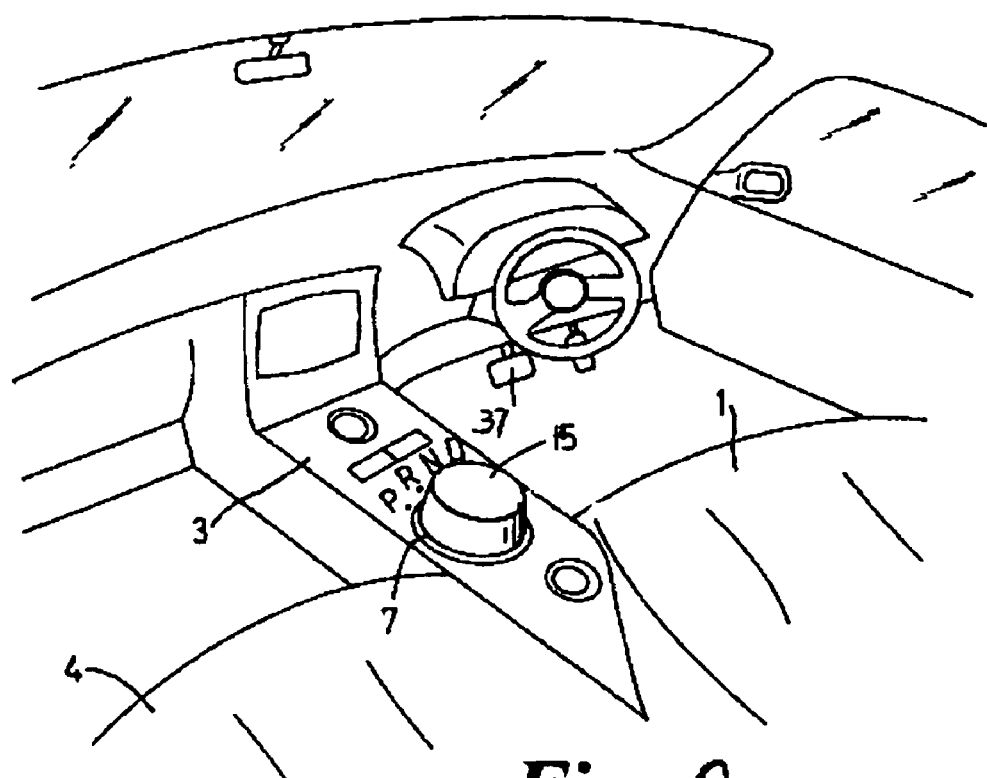
FIG. 9 is perspective view showing a modification to the selector mechanism shown in FIGS. 1 to 8, the selector mechanism being located in a console between the front seats of a vehicle passenger compartment and having a selector shown in an active position.

For example, it will be appreciated that under a fault condition or 'limp home', the driver can still move the selector knob 15. This can lead the driver to think that a new selection mode, for instance Reverse, is available. Such operation of the selector knob 15 can lead to unexpected and possibly dangerous motion of the vehicle. Hence to overcome this problem, in addition the selector mechanism 10 may include an actuator, conveniently referred to as the retractor actuator (not shown), e.g. an electric motor, controlled by the transmission unit control 26 that enables to retract the selector knob 15 inside a housing 7 forming part of a centre console 3 mounted between the driver's seat 1 and a passenger seat 4 into an inactive position, as show FIG. 9, where it cannot be readily moved by the driver. Thus, the driver can physically understand that the vehicle is in a failure mode and is discouraged from driving the vehicle for long periods in a faulty condition.

Figure 10:
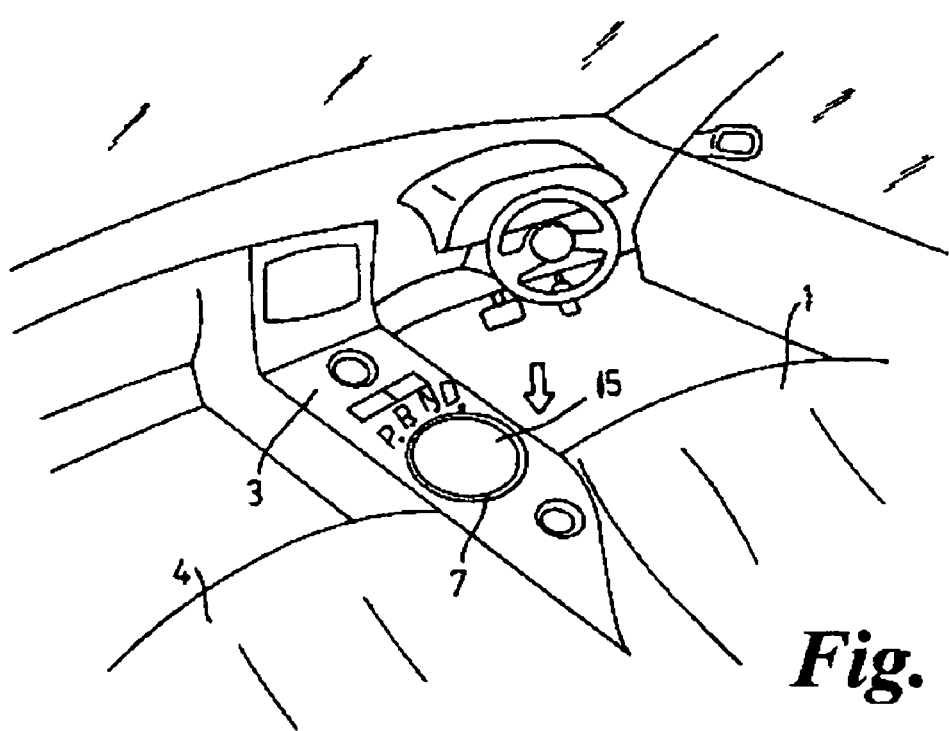
FIG. 10 is a view based on FIG. 9 showing the selector in an inactive position.

The retractor actuator may also be controlled by the transmission control unit 26 when the engine 12 is started or stopped. Starting the engine causes the selector knob 15 to rise from the housing 7 (FIG. 9) while stopping the engine causes the selector knob 15 to drop into the housing 7 (FIG. 10). Thus, the selector knob 15 can be displaced either to an inactive position in which it is retracted inside the housing 7 when the driver turns the engine ignition off or an active position in which it is projects outside the housing 7 when the driver turns the engine ignition on.

In a modification, the illuminated pointer could be replaced by a mechanical pointer which can retract into a hidden position when the engine ignition is turned off or extend into a visible position when the engine ignition is turned on. The retractable pointer may be located inside or outside the selector knob. Also the electro-magnet clamp described above could be replaced by mechanical devices operating the same function. Alternatively, the dynamic indicator could simply comprise illuminated labels, the label corresponding to the current mode of the transmission being brighter than the others. Also, the selector knob could be replaced by a lever moving about a horizontal axis, e.g. in a fore and aft plane. Furthermore, the selector mechanism could include other functions mounted in the same housing, e.g. an engine start button or a driving mode selector (casual driving, highway driving, driving on snow, etc.).

The invention claimed is:

1. A selector mechanism for a motor vehicle transmission having a number of operating modes, the selector mechanism comprising: a housing, a rotary handle movable in the housing between a number of selector positions, each position being associated with a respective one of the operating modes of the transmission, a rotary selector which in normal use of the selector mechanism is connected to the rotary handle so as to rotate with the rotary handle, sensor means for sensing the position of the rotary selector and generating selector signals to a transmission control unit which in use supplies control signals to the transmission, an indexing means for maintaining the rotary handle in each of its positions, a drive correction means and clutch devices to engage the rotary selector to one of the rotary handle and the drive correction means, wherein the clutch devices and the drive correction means in use are controlled by the transmission control unit to move the rotary selector from a selector position selected by the driver by means of the rotary handle to another selector position representative of the operating mode of the transmission by means of the drive correction means without moving the rotary handle.

2. The selector mechanism of claim 1 and further comprising a dynamic indicator which in use is arranged to indicate the operating mode of the transmission.

3. The selector mechanism of claim 2 wherein the dynamic indicator in use is connected to the transmission control unit to be visible when the vehicle is to be driven and move with the rotary selector.

4. The selector mechanism of claim 2 wherein the dynamic indicator comprises an illuminated pointer and an arrangement of illuminated labels indicating the selector mode.

5. The selector mechanism of claim 4 wherein the rotary handle has a top surface and the illuminated pointer is constituted by a one of several light sources circumferentially distributed behind the top surface of the rotary handle.

6. The selector mechanism of claim 1 and further comprising a retractor actuator which in use is controlled by the transmission control unit to displace the rotary handle between an active position where it can be manually moved between the selector positions by the driver of the vehicle, and an inactive position in which it is retracted inside the housing where it cannot be readily moved by the driver.

7. The selector mechanism of claim 1 and further comprising a spring-loaded detent member carried by the housing and wherein the rotary selector comprises a detent plate having notches for cooperation with a spring-loaded detent member.

8. The selector mechanism of claim 7 and further comprising a stop carried by the housing and wherein the detent plate has a slot which cooperates with the stop to limit the rotation of the detent plate between the two extreme selectable modes of the transmission.

9. The selector mechanism of claim 7 wherein the sensor means for sensing the position of the selector comprises an encoder.

10. The selector mechanism of claim 1 and further comprising a locking device which in use is controlled by the transmission control unit to prevent rotation of the rotary handle when disconnected from the rotary selector.

11. The selector mechanism of claim 1 wherein one of the selector positions is a manual mode position in which position the selector mechanism is operable for use with an auxiliary selector in order to control the gear ratios of the transmission in a pulse manner.

12. A selector mechanism for a vehicle transmission driven by an engine, the selector mechanism comprising: a housing, a selector movable in the housing between a number of selector positions each associated with a respective operating mode of the transmission, sensor means for sensing the position of the selector and generating selector signals to a transmission control unit which in use supplies control signals to the transmission, and a retractor actuator which in use is controlled by the transmission control unit to displace the selector between an active position where it can be manually moved between the selector position by the driver of the vehicle, and an inactive position in which it is retracted inside the housing where it cannot be readily moved by the driver.

13. The selector mechanism of claim 12 wherein the selector is a rotary switch.

14. The selector mechanism of claim 13 and further comprising a drive correction means which in use is connected to the transmission control unit to move the selector from a selector position selected by the driver to another selector position representative of the operating mode of the transmission.

15. The selector mechanism of claim 14 wherein the drive correction means is operable to prevent manual movement of the selector.

* * * * *

UNITED STATES PATENT AND TRADEMARK OFFICE
CERTIFICATE OF CORRECTION

PATENT NO. : 7,571,662 B2
APPLICATION NO. : 11/205486
DATED : August 11, 2009
INVENTOR(S) : Pickering et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 862 days.

Signed and Sealed this

Fourteenth Day of December, 2010

David J. Kappos
*Director of the United States Patent and Trademark Office*